United States Patent [19]

Tangorra

[11] Patent Number: 4,573,953

[45] Date of Patent: Mar. 4, 1986

[54] DRIVING BELT

[75] Inventor: Giorgio Tangorra, Monza, Italy

[73] Assignee: Industrie Pirelli S.p.A., Milan, Italy

[21] Appl. No.: 606,627

[22] Filed: May 3, 1984

[30] Foreign Application Priority Data

May 4, 1983 [IT] Italy ................................ 20924 A/83

[51] Int. Cl.$^4$ .......................... F16H 55/30; F16H 7/02
[52] U.S. Cl. ..................................... 474/152; 474/204; 474/153
[58] Field of Search .............................. 474/152–154, 474/159, 161–164, 170, 174, 188, 189, 202, 204, 260–263, 268

[56] References Cited

U.S. PATENT DOCUMENTS

| | | | |
|---|---|---|---|
| 336,407 | 2/1886 | Hanks et al. | 474/153 X |
| 862,240 | 8/1907 | Diehl | 474/153 X |
| 3,498,684 | 3/1970 | Hallaman | 474/204 X |
| 3,515,443 | 6/1970 | Hallaman | 474/204 X |
| 3,577,794 | 5/1971 | Kerfoot, Jr. | 474/204 |
| 3,642,120 | 2/1972 | Duhan | 474/153 X |

Primary Examiner—Stephen J. Novosad
Assistant Examiner—Thuy M. Bui
Attorney, Agent, or Firm—Stevens, Davis, Miller & Mosher

[57] ABSTRACT

A continuous driving belt, adapted for transmitting movement between two elements, each one of which is rotatable around an axis and which is provided with pins projecting in the radial direction with respect to said axis, which are adapted for insertion into corresponding holes made in the belt itself. Said belt is constructed with a primary, deformable polymeric material having a Shore-A hardness greater than 75 degrees, and is provided with a reinforcing structure that comprises a plurality of annular elements which are embedded in said primary material and which are constructed out of a secondary material that presents an elongation substantially less than that of said primary material. The annular elements lie on planes that are substantially parallel to the longitudinal plane of the mid-plane of the belt itself.

6 Claims, 9 Drawing Figures

4,573,953

DRIVING BELT

DESCRIPTION

The present invention relates to a continuous driving belt adapted for transmitting mechanical power in a synchronous manner and which provides a high output and a good resistance-to-fatigue.

Various types of belts are known that are capable of transmitting mechanical power, which are differentiated from one another because of the form of their resistant section (rectangular or trapezoidal), because of the materials with which they are constructed, and because of the reinforcing structures that are associated with these materials themselves, for the purpose of increasing their mechanical resistance. There are also made, in certain types of these belts, real and proper teeth adapted to mesh with the corresponding teeth with which the pulleys are provided and upon which said belts travel in such a way as to allow the transmission of mechanical power.

The known belts of the type described, however, present numerous drawbacks and disadvantages.

First and foremost, critical vibration frequencies are encountered whenever belt speeds required in normal applications are reached, with the consequence of generating particularly high stresses in the belts themselves. This unfavorable condition is caused by the mass per unit length of the belt, which is especially high in belts of the type described.

Moreover, the known belts are not very flexible—due to the high rigidity of the material from which they are constructed, due to the shape of their cross-section, and due to their reinforcing structure. Hence, for causing them to adhere in a correct manner to the surface of the pulleys around which they must travel, it is necessary to apply rather high tensional forces to them. Moreover, in other instances, and owing to the discontinuity of the belt structure, it is not rendered possible to obtain with it a circumference deformed into an arc, as is necessary for permitting it to couple on the said pulley surfaces, because it tends to assume a polygonal figuration.

What is more, these belts are rather "noisy", particularly at high speeds, owing to the considerable forces of inertia generated during the rotation of the belt and due to the discontinuity of their structure.

Finally, some belts of the type described allow for realizing just those transmissions between pulleys having a mid-plane that is contained substantially in the same plane. As a matter of fact, whenever the median planes of these pulleys are not coincident, or if they are fitted on skew-axes, certain irregularities are encountered in the transmission, or else abnormal strains are generated which rapidly bring about a rupturing of the belt.

The aim of the present invention is to realize a continuous driving belt that is devoid of all the drawbacks mentioned above, and hence which—apart from being able to transmit high torques—also displays good resistance to fatigue, and that also proves to be considerably lighter in weight, and that also displays good flexibility and a high grade of "noiselessness", and which is also capable of readily transmitting movement between pulleys that are disposed in diverse planes on skew-axes.

On the basis of the present invention, there is provided a continuous driving belt adapted for transmitting movement between two elements, each one of which is rotatable around an axis and moreover provided with pins projecting in the radial direction with respect to said axis, said pins being insertable into corresponding seats made in the belt itself, characterized in that said belt is constructed out of primary, polymeric, deformable material having a Shore-A hardness greater than 75 degrees, and being provided with a reinforcing structure that comprises a plurality of annular elements which are embedded in said primary material, and which are constructed out of a secondary material that presents an elongation substantially less than that of said primary material. Said belt is moreover characterized in that said annular elements lie on planes which are substantially parallel to the longitudinal mid-plane of the belt. The above-said reinforcing structure comprises, for the sake of convenience, at least two series of said annular elements, each one of which is disposed on one side with respect to said seats.

For a still better understanding of the belt structure of the present invention, there is now given (solely by way of non-limiting example) a more detailed description with reference to the attached drawings, wherein.

Figure 1:
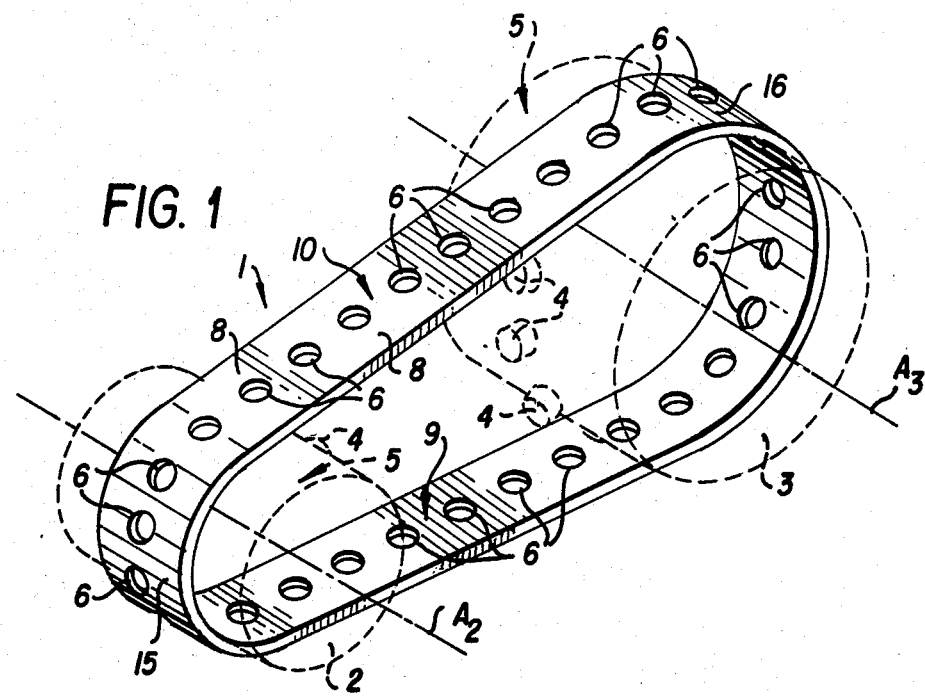
FIG. 1 represents a perspective view of a transmission wherein the belt of this invention is used.

First, and referring to FIG. 1, the driving belt of the present invention is indicated as a whole with the numeral 1 and is adapted for transmitting movement between two rotatable elements 2, 3, that are affixed to the axes $A_2$, $A_3$. The above-said elements may be comprised of pulleys, rollers, drums, or of any other elements whatsoever that are adapted to be part of a transmission that is actuated by a continuous belt.

The belt of the present invention is destined for cooperating with the rotating elements 2 and 3, each one of which is provided with a series of pins 4 that project radially from the external cylindrical surface 5 of the element itself. The belt of the invention is, hence, provided with at least a series of seats adapted for coupling or co-acting with the corresponding pins 4 of the rotating elements 2 and 3. The above-said seats, in the embodiment illustrated in FIGS. 1–8, have the form of cylindrical holes 6.

Figure 2:
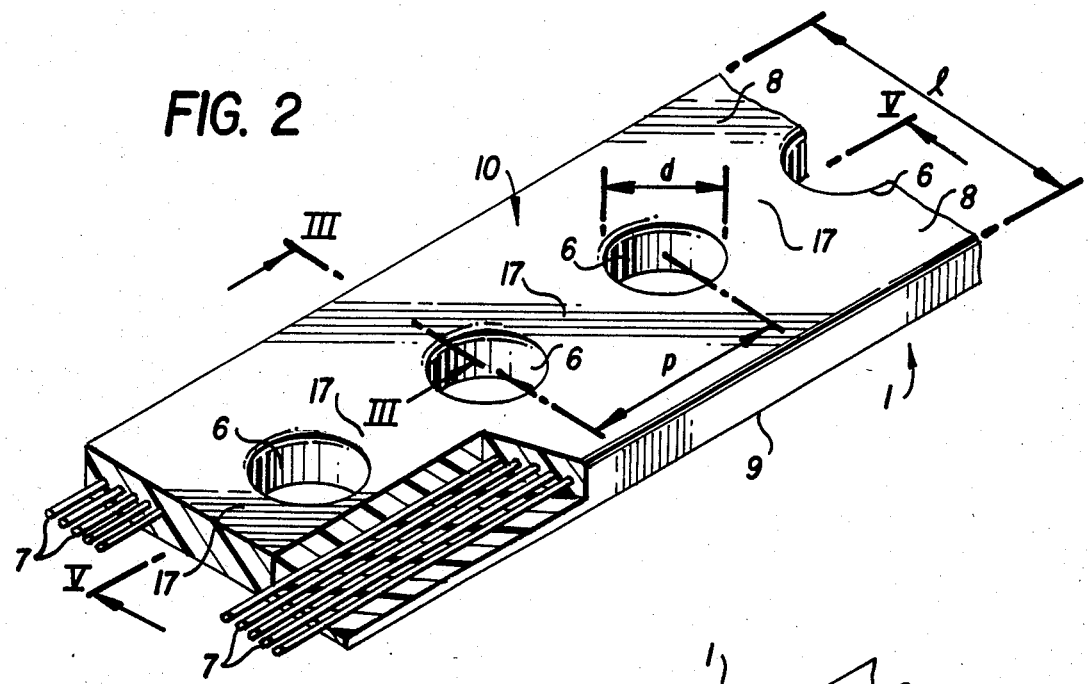
FIG. 2 represents a length of belt according to one embodiment of the invention.

The belt of the invention is constructed out of a deformable, polymeric material having a Shore-A hardness of 75 degrees, and is provided with a reinforcing structure that comprises a plurality of annular elements (indicated, in their complex whole, with the numeral 7 as, e.g., in FIG. 2) that are embedded in the material of the belt and which are constructed out of another material that presents a substantially lesser elongation than that of the material out of which the belt itself is constructed. Each one of these annular elements 7 lies on a plane that is substantially parallel to the longitudinal mid-plane of the belt, as can be seen clearly in FIG. 2. The said reinforcing structure comprises at least two series of annular elements 7, each one of which is disposed on one side with respect to the holes 6 made in the belt itself, and it is positioned on the horizontal mid-axis of said section (FIG. 3) or else below it (FIG. 4). Therefore, according to this embodiment, for the purpose of adequately lodging the two series of annular elements 7, there are provided bands 8 placed laterally with respect to the said holes 6, in which there are embedded the annular elements themselves. The width of these bands 8 is chosen in such a way that if d indicates the diameter of each hole 6, the overall width l of the belt is between twice and four times the diameter d.

Figure 5:
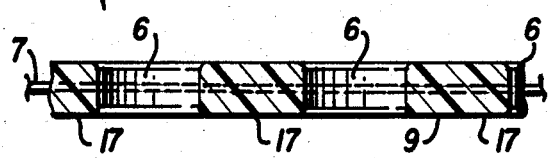
FIG. 5 is a section, in large-scale, of the belt of FIG. 2, showing a plane of broken lines V—V.
Figure 3:
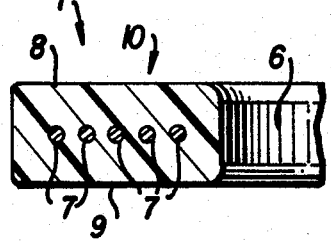
FIG. 3 represents a large-scale detail of the belt section along a plane of broken lines III—III of FIG. 2.
Figure 4:
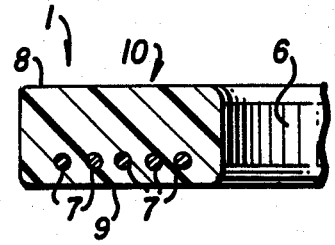
FIG. 4 is a similar section as that of FIG. 3, showing a variation of the reinforcing structure of the belt.

The belt section is conveniently rectangular, and hence presents a pair of main surfaces 9 and 10 which are conveniently connected with the surfaces of the holes 6, as can be clearly seen in FIGS. 3, 4 and 5. For the purpose of allowing one to transmit high belt-horsepowers, the diameter d of each hole 6 is between 3/10 and 8/10 of the distance p (FIG. 2) between the axes of two contiguous holes 6.

Figure 6:
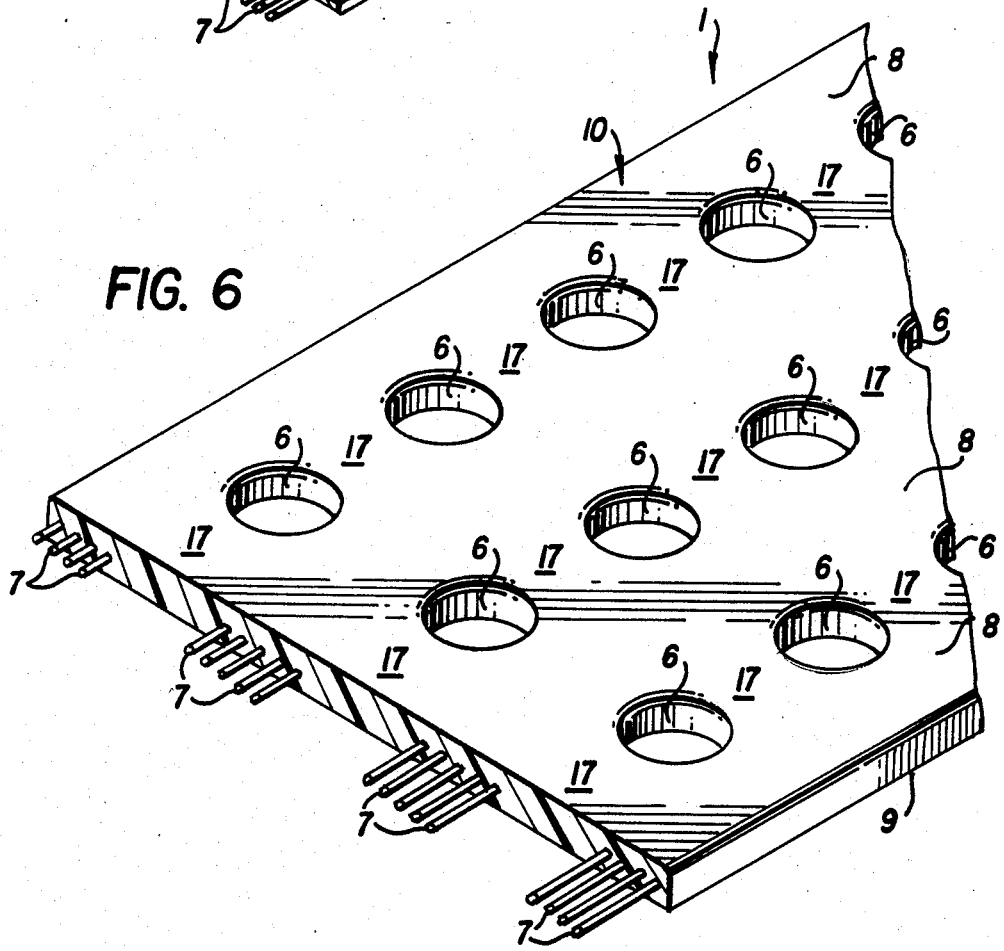
FIG. 6 represents a perspective view of a belt length of another embodiment.

The belt of the present invention may comprise, for convenience, several series of holes 6, the axes of which lie, for example, in parallel planes, as is represented in FIG. 6. In this embodiment, from each side of every one of the said series of holes there is disposed a series of annular elements 7, each one of which, as happens in the case of the previous embodiment, lies on a plane that is substantially parallel to the longitudinal mid-plane of the belt.

Figure 7:
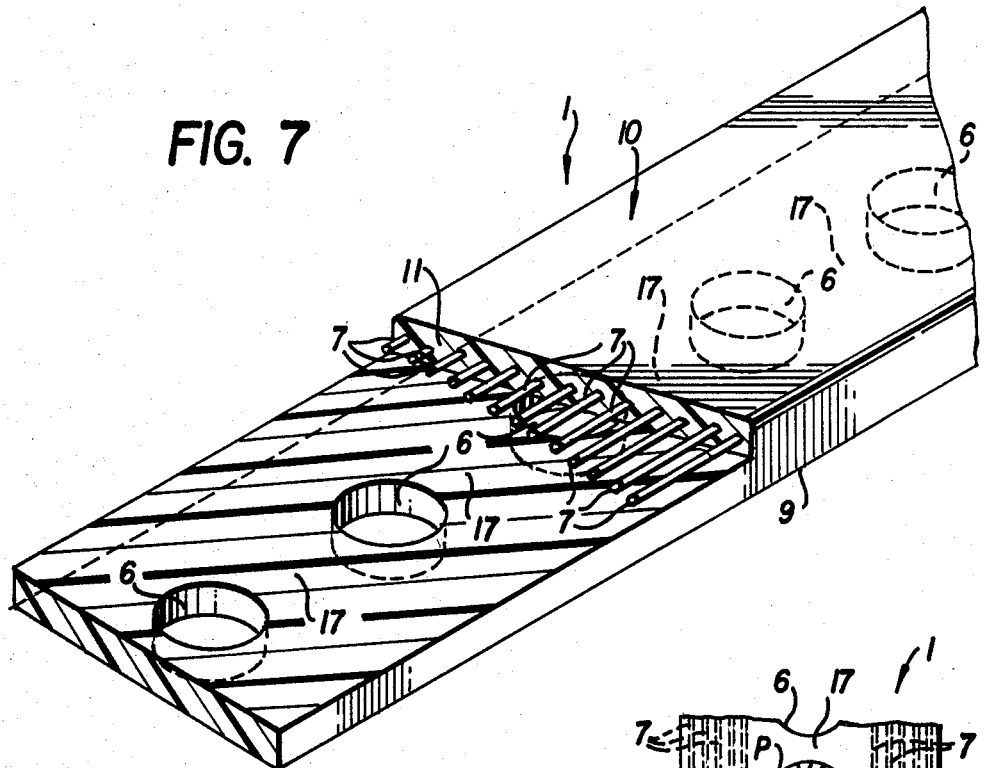
FIG. 7 represents a perspective view of a belt length of still another embodiment.

Moreover, the structure of the belt of this invention may be constructed and arranged in the manner indicated in FIG. 7 and can comprise holes 6 which do not go completely through the belt, and for which reason there is defined in this way a layer of material 11 above, on the inner side of which there are lodged the annular elements 7 of the reinforcing structure, each one of said elements 7, similarly to that in the previously described embodiments, lying on a plane that is substantially parallel to the longitudinal mid-plane of the belt.

Figure 9:
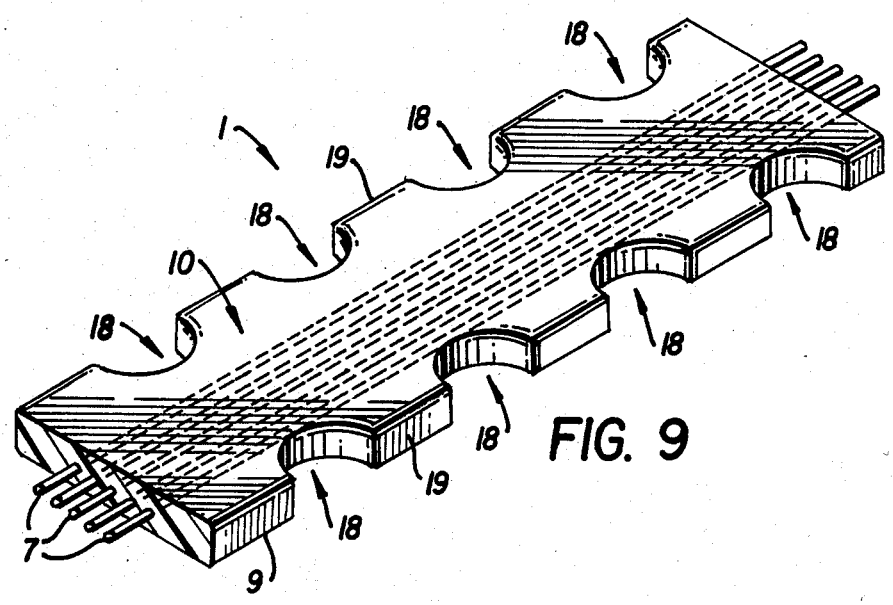
FIG. 9 represents a perspective view of a belt length of a still different embodiment.

A further embodiment of the belt according to this invention is illustrated in FIG. 9. Here the seats made for coupling or co-acting with the pins 4 are not cylndrical holes, but instead are recesses 18 that are arc-shaped in circumference, provided on the lateral edges 19 of the belt itself. There recesses, just like the holes 6 of the previously described embodiments, are adapted for co-operating with the pins 4 for transmitting the desired movement between the elements 2 and 3. In this way, the belt presents curved edges, and the annular elements 7 are disposed in its central part between the two series of recesses 18.

It has been established that if the material from which the belt is constructed is a polymeric material which presents the Shore-hardness indicated hereabove (exceeding 75), and if its structure corresponds to one of those that have been already illustrated and described, there results a belt with a high deformability, such as is needed for allowing it to adhere to the external surface 5 of the rotating elements 2 and 3, but without being required to apply any initial forcing tensions to the belt itself. Any resilient deformed configurations are originated which have a rigorously arc-shaped circumference, such as those necessary for assuring a correct and constant meshing between the holes 6 and the pins 4 of the rotating elements 2 and 3. The materials that have provided to be particularly suited for constructing the belt of this invention are rubber compounds, various materials that are impregnated in rubber solutions, polyurethanes and various other polymers—even those that are very hard.

The annular elements 7 of the reinforcing structure may be constructed out of any material whatsoever having an elongation that is substantially less than that of the basic material used for the belt. For this purpose there can be utilized steel wires, fiberglass cords or filaments, polyester cords or filaments, thermoplastic resins, such as nylon, rayon or any other fiber whatsoever that presents the characteristics defined hereabove, or else tapes made of a resistant and flexible material.

As an annular element for the reinforcing structure, there may also be used a tape, or more generically, at least one layer of polymeric material, for example, drawn nylon, crosslinked polyethylene, polyester, having a variable thickness; still by way of example, between 0.1 and 2 mm.

These layers may be disposed over the entire width of the belt, and they are anchored to the first polymeric material; for example, in an intermediate position for vulcanizing or for adhesion, as the case may be. Said continuous layer of material embedded in the thickness of the belting material is perforated successively when on the entire belt body, and for the entire development when (through suitable tools) the holes necessary for the meshing with the pulley dowels are made.

In this instance, this material in ribbon form, or more generically, in layers of polymeric material, involves the zone between one hole and the next—and not just the lateral zones.

For the sake of convenience, in the elastomeric basic material of the belt there is inserted at least one non-oriented reinforcing material. This material may be in the form of short filaments uniformly distributed in the basic material used; or else, in the form of one or several layers of felt, impregnated in the material itself, and incorporated in it. In both these instances, said reinforcing material does not prevent any preferential orientation inside the mass of the basic material used.

The functioning and behavior of the described belts during use take place in the following manner:

When the belt is passed around the rotating elements 2 and 3, as is shown in FIG. 1, the belt lengths indicated in said figure by numerals 15 and 16 that are wound around the cylindrical surfaces 5 of the rotating elements 2 and 3, assume a rigorously deformed arc-shaped circumference, requiring no forces to be applied to the axes $A_2$ and $A_3$, in the opposite direction, which would tend to induce initial forcing tensions on the belt (belt pulling). This is due either to the described belt structure or to the nature and/or the characteristics of the basic material used for the belting itself.

During use, when the movement is transmitted through the belt from the driving rotating-element to the driven rotating-element, the wound lengths 15 and 16 stay permanently in contact with the corresponding coupling surfaces 5, and hence the meshing is correctly maintained between the holes 6 of the belt itself and the pins 4 of the rotating elements 2 and 3. This favorable condition results from the fact that, even during use, the elastic strain of the lengths 15 and 16 that are wound on the pulleys is rigorously always maintained in an arc-shaped circumference, even though, owing to the presence of the holes 6 in the belt, it should present discontinuities from the geometrical point of view. Even this results as due either to the nature itself of the belting material or else to the very belt structure.

Figure 8:
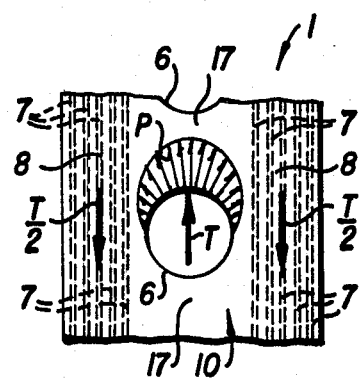
FIG. 8 represents, schematically, the distribution of the pressures and the transmission of the forces, during the transmission of the movement between the belt and the pulley on which it is mounted.

When the driving rotating-element transmits, through the belt, a certain power to the driven rotating-element, each pin 4 that is coupled with a corresponding hole 6 transmits to the belt a tangential force T, indicated schematically in FIG. 8, which generates on the active surface of the hole itself a distribution of pressures p having approximately the layout as shown in said FIG. 8. Owing to the dimensions of each staple 17 of belting material that is comprised between two contiguous holes 6, and owing to the nature of the belting material itself that is used, no sensible deformations are produced in the staples themselves, and the pressures p are transmitted to the annular elements 7 of the supporting structure, which has precisely the purpose of resisting the tangential forces that are generated during the transmission of the movement. Hence, a structure is provided wherein the belting material that is comprised between two contiguous holes 6 presents a mechanical resistance and rigidity which are sufficient for bringing about an efficacious transmission of the presures p from the staples 17 to the annular elements 7 of the reinforcing structure, without originating any deformations, either in the holes or in the staples, which could vary the geometrical conditions of the coupling, or which could induce cyclic deformations in the belting material that could bring about excessive heating, owing to the internal damping or to fatigue failure. It has been discovered that the meshing conditions between the belt and the rotating-elements remain correct always, even should the axes $A_2$ and $A_3$ be or become skewed, or even should the planes not be or remain coincident on which the axes of the pins 4 are contained of the rotating-elements 2 and 3.

Moreover, the belt of this invention is particularly lightweight, and presents a weight per length unit, at a parity with the tangential force transmitted, that is well below the weight which, under otherwise the same conditions, is found in known belts.

Thanks to said reduced weight, any critical vibration frequencies for rotation speeds are rather high, and much higher than are found during use in those transmissions wherein the belt of the present invention is applied. However, such vibrations are intrinsically very damped, owing to the low inertia per length unit. This latter favorable characteristic allows for traversing, with speed and ease, the range of velocities in correspondence to which there is found precisely the above-mentioned critical frequencies, and for attaining, with reliability, the condition of use wherein any such critical frequencies are found to be quite absent.

Moreover, owing to said "lightweightedness" of the belt structure and the nature of the belting material used for constructing it, a considerable "noiselessness" is achieved during functioning; in particular, at very high speeds.

Finally, this belt structure can be utilized by coupling with the surfaces 5 of the rotating elements 2 or 3 either one of its main surfaces 8 and 9, with in this manner having the advantage of being able to realize, indifferently, couplings that involve one or the other of the two above-said surfaces. The construction of the belt is simple and facile, with it also being possible to obtain from a tape of extruded material, wherein there are already directly incorporated at the time of extrusion, wires which are adapted for originating the annular elements 7 and on which the holes 6 are successively made, in any convenient way. By cutting convenient lengths from said tape and by joining the extremities of these lengths by means of per se known techniques, belts having any predetermined dimensions may be readily obtained.

What is claimed is:

1. A continuous driving belt of elastomeric material adapted for transmitting movement between two pulleys having external cylindrical surfaces, each of the pulleys being rotatable around an axis and also being provided with pins projecting radially from said external surface and adapted for insertion into corresponding holes made in the belt itself when the wound lengths of the belts stay in contact over the whole width with the external surfaces of the pulleys, said belt having an elastomeric material provided with a Shore-A hardness greater than 75 degrees and the bands of the belt placed laterally with respect to said holes embedding a reinforcing structure formed by a plurality of annular elements parallel to the longitudinal mid-plane of the belt and being constructed of a material having an elongation which is substantially less than that of the elastomeric material, whereby when during use movement is transmitted between the pulleys and the belt, the elastic strain of the lengths of the belt which are wound on the pulleys is rigorously always maintained in an arc-shaped circumference.

2. A belt according to claim 1, characterized in that it comprises a series of holes the axes of which lie substantially in said longitudinal mid-plane of the belt, the width of the belt being between twice and four times the diameter of the holes themselves.

3. A belt according to claim 2, characterized in that the diameter of each of said holes is between 3/10 and 8/10 of the distance between the axes of two contiguous holes.

4. A belt according to claim 1, characterized in that into said primary material there is inserted at least a non-oriented reinforcing material.

5. A belt according to claim 1, characterized in that said secondary material is steel.

6. A belt according to claim 1, characterized in that said secondary material is glass, each one of said annular elements comprising one or several wires or fiberglass cords.

* * * * *